(12) United States Patent
Zhang et al.

(10) Patent No.: US 12,360,814 B2
(45) Date of Patent: Jul. 15, 2025

(54) COMPUTING RESOURCE MANAGEMENT METHOD, ELECTRONIC EQUIPMENT AND PROGRAM PRODUCT

(71) Applicant: EMC IP Holding Company LLC, Hopkinton, MA (US)

(72) Inventors: Ming Zhang, Beijing (CN); Chen Gong, Beijing (CN); Donglei Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 527 days.

(21) Appl. No.: 17/743,573

(22) Filed: May 13, 2022

(65) Prior Publication Data
US 2023/0100110 A1  Mar. 30, 2023

(30) Foreign Application Priority Data
Sep. 18, 2021  (CN) .......................... 202111101681.7

(51) Int. Cl.
*G06F 9/50*  (2006.01)
(52) U.S. Cl.
CPC ................................. *G06F 9/5033* (2013.01)
(58) Field of Classification Search
None
See application file for complete search history.

(56) References Cited

U.S. PATENT DOCUMENTS

| 8,887,166 B2 * | 11/2014 | Gerovac | H04L 47/762 |
| | | | 711/170 |
| 9,298,493 B1 | 3/2016 | Harel et al. | |
| 11,372,554 B1 | 6/2022 | Feng et al. | |
| 2004/0236817 A1 * | 11/2004 | Huberman | G06Q 10/10 |
| | | | 709/200 |
| 2009/0183168 A1 * | 7/2009 | Uchida | G06F 9/5027 |
| | | | 718/104 |
| 2010/0011365 A1 | 1/2010 | Gerovac et al. | |
| 2010/0191876 A1 | 7/2010 | Muppirala et al. | |

(Continued)

FOREIGN PATENT DOCUMENTS

| CN | 109521963 A | 3/2019 |
| CN | 110554834 A | 12/2019 |

(Continued)

*Primary Examiner* — Charles E Anya
(74) *Attorney, Agent, or Firm* — BainwoodHuang (57) ABSTRACT

A technique for computing resource management involves determining a first resource request frequency based on the number of trigger signals received from a storage device during a first period. The trigger signals are generated when a data amount of modified metadata stored in the storage device reaches a threshold data amount. The technique further involves determining a second resource request frequency based on the number of trigger signals received from the storage device during a second period subsequent to the first period. The technique further involves adjusting computing resources for performing an operation of copying the modified metadata in the storage device to a storage medium based on a comparison of the first resource request frequency and the second resource request frequency. Accordingly, computing resources can be fully utilized, and an operation of copying modified metadata to a magnetic disk can be timely performed.

20 Claims, 5 Drawing Sheets

(56) References Cited

U.S. PATENT DOCUMENTS

| | | | |
|---|---|---|---|
| 2011/0119679 A1 | 5/2011 | Muppirala et al. | |
| 2011/0247003 A1* | 10/2011 | Fong | G06F 9/5061 |
| | | | 718/104 |
| 2012/0203986 A1 | 8/2012 | Strasser et al. | |
| 2014/0089917 A1* | 3/2014 | Attalla | G06F 9/5083 |
| | | | 718/1 |
| 2014/0244897 A1* | 8/2014 | Goss | G06F 12/0238 |
| | | | 711/103 |
| 2017/0373988 A1* | 12/2017 | Soffe | G06Q 40/12 |

FOREIGN PATENT DOCUMENTS

| | | | | |
|---|---|---|---|---|
| CN | 110688066 A | 1/2020 | | |
| WO | WO 2016091139 A1 * | 6/2016 | | G06F 3/061 |

\* cited by examiner

COMPUTING RESOURCE MANAGEMENT METHOD, ELECTRONIC EQUIPMENT AND PROGRAM PRODUCT

CROSS-REFERENCE TO RELATED APPLICATION

This application claims priority to Chinese Patent Application No. CN202111101681.7, on file at the China National Intellectual Property Administration (CNIPA), having a filing date of Sep. 18, 2021, and having "COMPUTING RESOURCE MANAGEMENT METHOD, ELECTRONIC EQUIPMENT AND PROGRAM PRODUCT" as a title, the contents and teachings of which are herein incorporated by reference in their entirety.

TECHNICAL FIELD

Embodiments of the present disclosure relate to the field of computers, and more particularly to a method, an electronic device, and a program product for computing resource management.

BACKGROUND

Metadata is the backbone of file systems, and most of the file systems utilize a log-type file system to modify the metadata so as to maintain metadata consistency in the event of a possible system crash. Meanwhile, the modified specific content of the metadata will be written to a metadata storage device (e.g., cache), and a computing device will modify the metadata in a true sense through the metadata storage device, i.e., write the modified specific content of the metadata from the metadata storage device to a storage medium (e.g., magnetic disk). A conventional write process is typically to allocate specific computing resources to corresponding transactions based on experience. For example, the number of threads for performing the write process and the number of input output (IO) resources are directly determined by table lookup. However, due to different factors such as tasks of data writing and types of storage devices, a conventional resource management strategy cannot flexibly deal with different scenarios, resulting in computing resource waste or non-timely writing of metadata to a disk.

SUMMARY

Embodiments of the present disclosure provide a solution for managing computing resources.

In a first aspect of the present disclosure, a method for computing resource management is provided. The method may include determining a first resource request frequency based on the number of trigger signals received from a storage device during a first period. The trigger signals are generated when a data amount of modified metadata stored in the storage device reaches a threshold data amount. The method may also include determining a second resource request frequency based on the number of trigger signals received from the storage device during a second period subsequent to the first period. Further, the method may include adjusting computing resources for performing an operation of copying the modified metadata in the storage device to a storage medium based on a comparison of the first resource request frequency and the second resource request frequency.

In a second aspect of the present disclosure, an electronic device is provided, including: a processor; and a memory coupled to the processor and having instructions stored therein which, when executed by the processor, cause the electronic device to perform actions including: determining a first resource request frequency based on the number of trigger signals received from a storage device during a first period, the trigger signals being generated when a data amount of modified metadata stored in the storage device reaches a threshold data amount; determining a second resource request frequency based on the number of trigger signals received from the storage device during a second period subsequent to the first period; and adjusting computing resources for performing an operation of copying the modified metadata in the storage device to a storage medium based on a comparison of the first resource request frequency and the second resource request frequency.

In a third aspect of the present disclosure, a computer program product is provided. The computer program product is tangibly stored on a computer-readable medium and includes machine-executable instructions which, when executed, cause a machine to perform any steps of the method according to the first aspect.

The Summary part is provided to introduce the selection of concepts in a simplified form, which will be further described in the Detailed Description below. The Summary part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical or similar reference numerals generally represent identical or similar components in the example embodiments of the present disclosure. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments illustrated in the accompanying drawings.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," and the like may refer to different or identical objects. Other explicit and implicit definitions may be included below.

As discussed above, in order to avoid metadata inconsistency occurring in the process of modifying metadata due to system crashes, a log-type file system is introduced. The log-type file system works according to the following principle: each time before modifying one piece of metadata, the modification of the metadata is logged in a relatively abstract language. The language only describes modification operations or modification events and is not really used to perform the modification. The location for logging is a logging device, which may be implemented with a permanently lossless storage medium. Thus, a response to modifying the metadata will be returned to a user. After or at the same time when logging is complete, a storage device for the metadata is modified. The storage device may be a cache, which is the only mapping of a magnetic disk space in the file system. The disk writing of the metadata in the cache (i.e., the process of finally writing the modification of the metadata to a magnetic disk) is performed by a metadata flush module. When the metadata is written to the magnetic disk, events of modifying the metadata recorded in a log device will be clear, thus experiencing the entire life cycle of modifying the metadata.

It should be understood that the reason for this is that if a system failure occurs, metadata consistency can be ensured in any case. For example, 1) if a system failure occurs during logging, it indicates that the modified event never occurs. 2) If a system failure occurs within a time period from logging to metadata disk writing, log replay may be executed in a system restart process since records in the log device are not cleaned, so that operations such as metadata disk writing are continued to be performed. 3) If a system failure occurs after the metadata disk writing is completed, the time when the metadata was modified is clear from the log device. Therefore, the system is restarted after the system failure, the operation of log replay is not performed, and the modified metadata has been written into the disk at this moment. Therefore, the log-type file system can ensure the consistency of the metadata without data errors in the whole metadata modification process.

However, a disk writing task for the modified metadata being copied from the cache to the magnetic disk needs to be completed by invoking computing resources. As previously described, conventional computing resource management solutions are: allocating a certain number of threads and a number of IO resources that can be enabled by each thread for a disk writing task based on experience or by way of table lookup. Since the allocation mode of computing resources is inflexible and inaccurate, there may be the problem that metadata is not timely written into a disk due to insufficient computing resources, and there may also be the problem that the computing resources are wasted due to excessive computing resources.

In order to address, at least in part, the above disadvantages, the embodiments of the present disclosure provide a novel solution for computing resource management. According to the solution, the working pressure of each cache used for storing metadata can be sensed on the premise of not remarkably increasing a computing workload, and computing resources allocated for performing the disk writing operation of the metadata can be further adjusted. That is, when a data amount of metadata stored in a corresponding cache is greater than a certain threshold, the cache sends a trigger signal for resource request to a computing device. The computing device determines, based on the number of trigger signals received within a period, resource request frequencies of these caches within the period. By comparing with the previous period, it is possible to determine whether a current resource management strategy is applicable and to appropriately adjust computing resources for performing the above disk writing task. Therefore, the computing resources can be fully utilized, and the disk writing operation can be timely performed.

Figure 1:
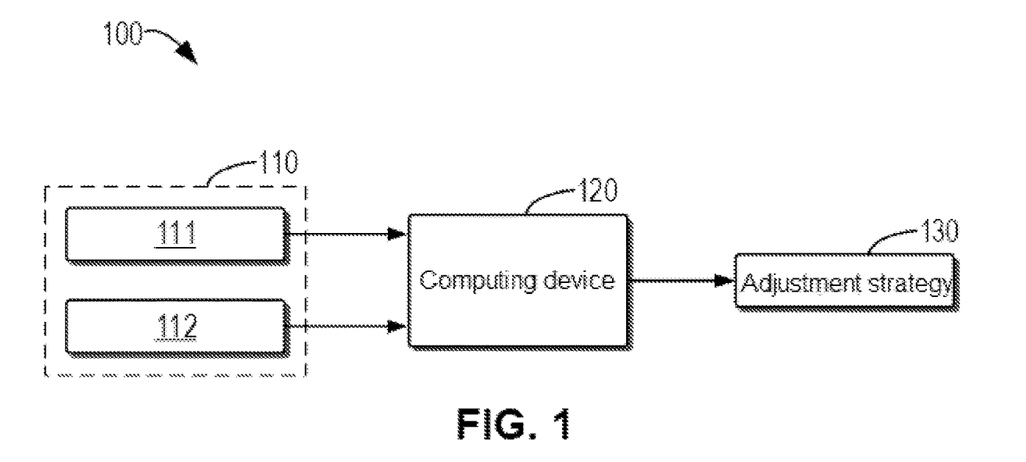
FIG. 1 shows a schematic diagram of an example environment according to an embodiment of the present disclosure.

FIG. 1 shows a schematic diagram of example environment 100 according to an embodiment of the present disclosure. In example environment 100, a device and/or a process according to embodiments of the present disclosure may be implemented. As shown in FIG. 1, example environment 100 may include storage device 110, computing device 120, and adjustment strategy 130. Computing device 120 computes the number of trigger signals that are received within a period and sent by any of caches 111 and 112 in storage device 110, thereby determining a frequency of requesting computing resources from storage device 110. Further, computing device 120 compares frequencies of requesting computing resources within adjacent periods. If it is found that the frequencies of requesting computing resources tend to increase, it is indicated that currently allocated computing resources are insufficient to perform the current disk writing task, thereby generating adjustment strategy 130 for adjusting an allocation mode of the computing resources.

In some embodiments, storage device 110 includes cache (s) for storing modified metadata: as shown in FIG. 1, cache 111 and cache 112. These caches may be replaced with various other types of devices with a storage function, including but not limited to a hard disk drive (HDD), a solid state disk (SSD), a removable disk, any other magnetic storage device and any other optical storage device, or any combination thereof. Alternatively or additionally, storage device 110 may also be a log device for storing a log describing a modification operation of metadata.

In some embodiments, computing device 120 may be any device with a computing capability. As a non-limiting example, the computing device may be any type of fixed computing device, mobile computing device, or portable computing device, including but not limited to a desktop computer, a laptop computer, a notebook computer, a netbook computer, a tablet computer, a smart phone, and the like. All or part of the components of the computing device may be distributed in a cloud. The computing device may also adopt a cloud-edge architecture.

A process for computing resource management according to an embodiment of the present disclosure will be described in detail below with reference to FIG. 2. For ease of understanding, the specific data mentioned in the following description are all illustrative and are not intended to limit the scope of protection of the present disclosure. It should be understood that the embodiments described below may also include additional actions not shown and/or may omit actions shown, and the scope of the present disclosure is not limited in this regard.

Figure 2:
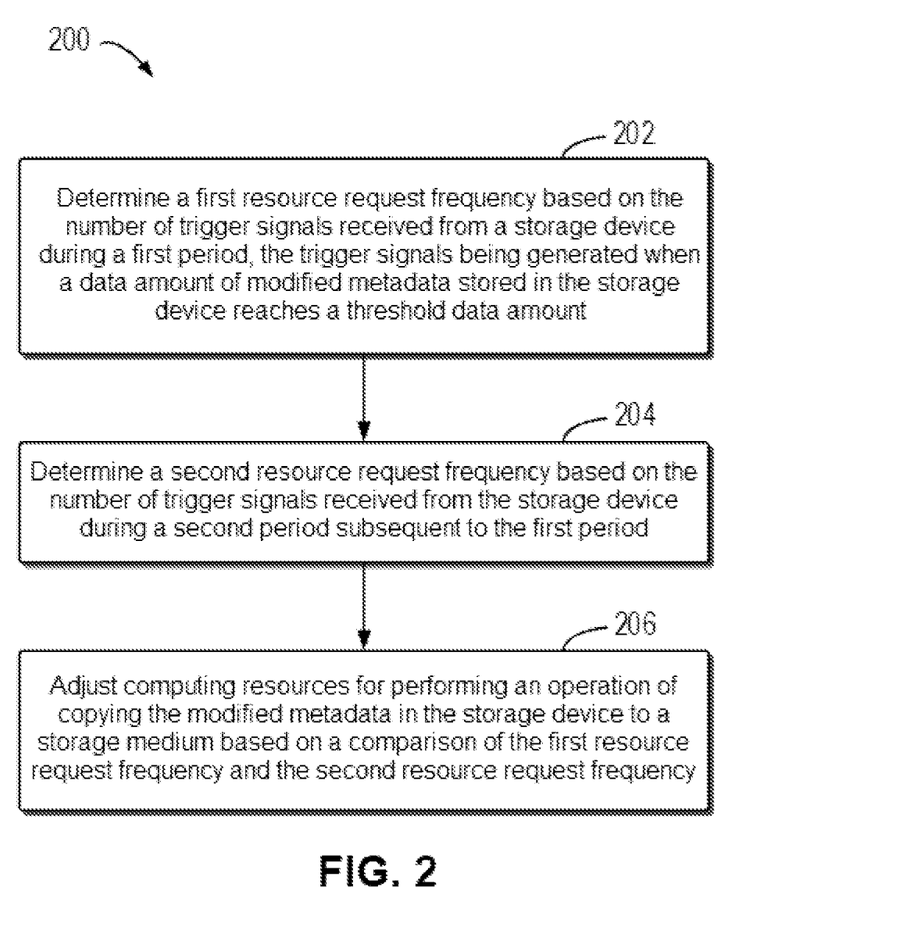
FIG. 2 shows a flow chart of a process for computing resource management according to an embodiment of the present disclosure.

FIG. 2 shows a flow chart of process 200 for computing resource management according to an embodiment of the present disclosure. In some embodiments, process 200 may be implemented in computing device 120 in FIG. 1. Process 200 for managing computing resources according to an embodiment of the present disclosure is now described with reference to FIG. 1. For ease of understanding, specific examples mentioned in the following description are all illustrative and are not used to limit the protection scope of the present disclosure.

As shown in FIG. 2, at 202, computing device 120 may determine a first resource request frequency based on the number of trigger signals received from storage device 110 within a first period. It should be understood that the "trigger signals" described here are generated when a data amount of modified metadata stored in storage device 110 reaches a threshold data amount.

In some embodiments, for each storage device 110, e.g. cache 111 and cache 112, when a data amount of metadata stored in a certain storage device such as cache 111 or cache 112 exceeds a predetermined proportion of a maximum storage capacity of this storage device, the storage device sends a resource request signal, i.e. a trigger signal, to computing device 120.

In order to sense whether a current computing resource allocation strategy is appropriate, computing device 120, by acquiring the number of trigger signals over a period of time, determines the frequency of computing resource requests sent by storage device 110 over the period of time. In order to conserve computing resources, computing device 120 may determine a resource request frequency based only on Boolean values collected at a plurality of time points regarding whether a trigger signal is received. The process for determining a resource request frequency will be described below in conjunction with FIGS. 3A and 3B.

Figure 3A:
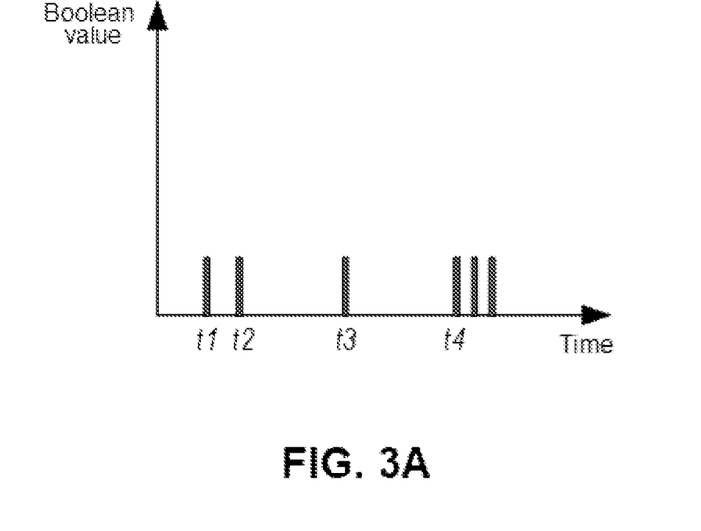
FIG. 3A shows a schematic diagram of a process for determining a Boolean value of a trigger signal according to an embodiment of the present disclosure.
Figure 3B:
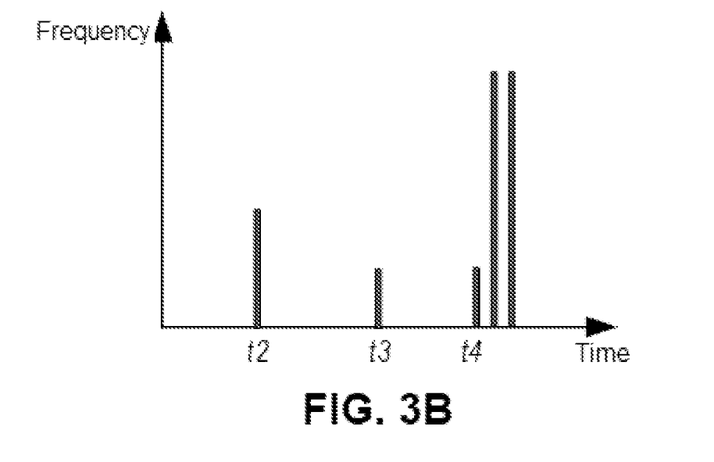
FIG. 3B shows a schematic diagram of a process for determining a resource request frequency of a trigger signal according to an embodiment of the present disclosure.

FIG. 3A shows a schematic diagram of a process for determining a Boolean value of a trigger signal according to an embodiment of the present disclosure. FIG. 3B shows a schematic diagram of a process for determining a resource request frequency of a trigger signal according to an embodiment of the present disclosure.

As shown in FIG. 3A, computing device 120 may be provided with a module for detecting whether a trigger signal is received. For each time point, a Boolean value of "0" may be used to indicate that no trigger signal is received, and a Boolean value of "1" may be used to indicate that a trigger signal is received. Therefore, Boolean values having a value of "1" detected at time points t1, t2, t3, and t4 are shown in FIG. 3A. It should be understood that for purposes of clarity of illustration, the Boolean values detected at time points t1, t2, t3, and t4 are only shown in a simplified manner in FIG. 3A.

As shown in FIG. 3A, a time difference between time points t1 and t2 is smaller than a time difference between time points t2 and t3. Therefore, as shown in FIG. 3B, it can be determined that the frequency of the trigger signal received at time point t2 is higher than that of the trigger signal received at time point t3. Similarly, since trigger signals received after time point t4 in FIG. 3A are denser, resource request frequencies detected after time point t4 in FIG. 3B will be higher. That is, the time difference of each Boolean value in FIG. 3A may be divided by a fixed value, so that the resource request frequency of each period, e.g. an average resource request frequency, may be sequentially determined. In this way, the resource request frequency of each period can be computed with a relatively small number of computing resources.

In some embodiments, when trigger signals are detected and collected at a plurality of time points within a period, a resource request frequency of the period may be determined using a trained resource request frequency determination model. It should be understood that the resource request frequency determination model may be trained using a plurality of sets of Boolean values as training data and labeled supervisory information corresponding thereto.

In some embodiments, when trigger signals are detected and collected at a plurality of time points within a period, a resource request frequency of the period may be determined using a time-frequency domain conversion algorithm such as Fourier transform.

Referring back to FIG. 2, at 204, computing device 120 may determine a second resource request frequency based on the number of trigger signals received from storage device 110 within a second period subsequent to the first period. In some embodiments, the first period and the second period are only used to represent two time periods that are adjacent one after the other or separated by a short time, and time lengths of the two time periods may be different.

It should be understood that computing device 120 may monitor whether the amount of data stored in storage device 110 exceeds a threshold data amount in order to sense whether the allocated computing resources are sufficient to complete the disk writing task of the modified metadata. When the amount of data stored in storage device 110 exceeds the threshold data amount, storage device 110 will send a trigger signal to computing device 120. Thus, the computing device can determine adjustment strategy 130 for the computing resources by determining a variation trend of the resource request frequency.

In some embodiments, as the number of trigger signals received over a period of time by computing device 120 is increased, it is indicated that the computing resources allocated by the current computing resource allocation strategy are insufficient to perform the disk writing task of metadata. However, as the number of trigger signals received over a period of time by computing device 120 is decreased, it is indicated that the computing resources allocated by the current computing resource allocation strategy are excessive, resulting in waste of computing resources. Thus, by determining the variation trend of the resource request frequency, reference information may be provided for the determination of adjustment strategy 130.

At 206, computing device 120 may adjust computing resources for performing an operation of copying the modified metadata in the storage device to a storage medium based on a comparison of the first resource request frequency for the first period and the second resource request frequency for the second period.

Figure 4:
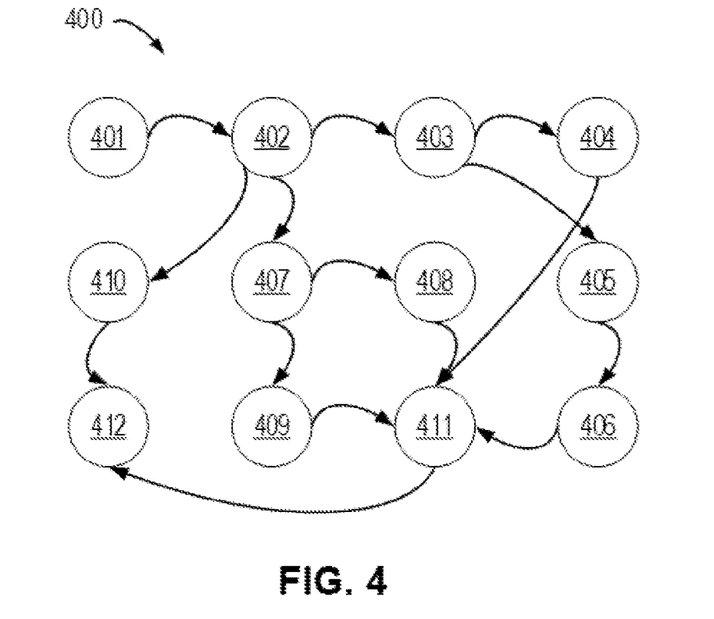
FIG. 4 shows a schematic diagram of a state machine for computing resource management according to an embodiment of the present disclosure.

FIG. 4 shows a schematic diagram of state machine 400 for computing resource management according to an embodiment of the present disclosure. As shown in FIG. 4, state machine 400 begins at state 401 and proceeds to state 402. At 402, computing device 120 may compare the first resource request frequency with the second resource request frequency. If the first resource request frequency is lower than the second resource request frequency, the flow proceeds to state 403 to increase computing resources. At 403, computing device 120 may further compare the number of enabled IO resources in an enabled thread with a threshold resource number. If the number of the enabled IO resources in the enabled thread is less than the threshold resource number, the flow proceeds to state 404 to cause non-enabled IO resources in the thread to perform a metadata disk writing operation. That is, IO resources in the thread are further enabled to increase computing resources. Or, if the number of the enabled IO resources in the enabled thread is greater than or equal to the threshold resource number, the flow proceeds to state 405 to cause non-enabled additional threads to perform a metadata disk writing operation. That is, other idle threads are further enabled to increase computing resources. Thereafter, the threshold resource number may be set in state 406.

It should be understood that the above "threshold resource number" is determined based on a maximum number of other IO resources that are enabled during a process from IO resources being enabled to being released. That is, when an asynchronous operation is performed by consecutively invoking a plurality of IO resources in a thread, each IO resource may start to perform the corresponding asynchronous operation without waiting for the previous IO resource to complete the asynchronous operation. Therefore, as an example, maximum data of other IO resources invoked within a time period from the first invoked IO resource in the plurality of IO resources consecutively invoked in a thread being invoked to being released is a maximum number of IO resources with which the thread can implement parallel IO, i.e. "threshold resource number." By determining the threshold resource number and determining whether a thread or IO resources are enabled or not accordingly, computing resources can be fully utilized, and the disk writing task of metadata can be timely processed.

Returning to state 402 of FIG. 4, if the first resource request frequency is higher than the second resource request frequency, the flow proceeds to state 407 to reduce computing resources for performing the above disk writing operation. At 407, computing device 120 may further compare the number of enabled threads with the threshold thread number. If the number of the enabled threads is greater than the threshold thread number, the flow proceeds to state 408 to release at least one of the enabled threads. That is, when excessive threads are enabled, a portion of the threads may be reclaimed to conserve computing resources. Or, if the number of the enabled threads is less than or equal to the threshold thread number, the flow proceeds to state 409 to release at least one enabled IO resource in the enabled threads.

Further, it is also possible that the first resource request frequency is equal to the second resource request frequency, i.e. state 410. In state 410, it is indicated that the current resource management strategy is appropriate, and therefore there is no need to change the management strategy for the computing resources.

Further, after states 404, 406, 408, and 409, the flow may also proceed to state 411 preferably for detecting whether the computing resources allocated by adjustment strategy 130 determined by computing device 120 are lower than a lower limit of computing resources for ensuring that the log-type file system may normally operate. At state 412, the process of computing resource adjustment within one period ends when all of these states are completed.

In this way, computing device 120 may adjust the computing resources for the disk writing operation based on a specific working state of each storage device, thereby making the process of metadata modification more efficient.

Figure 5:
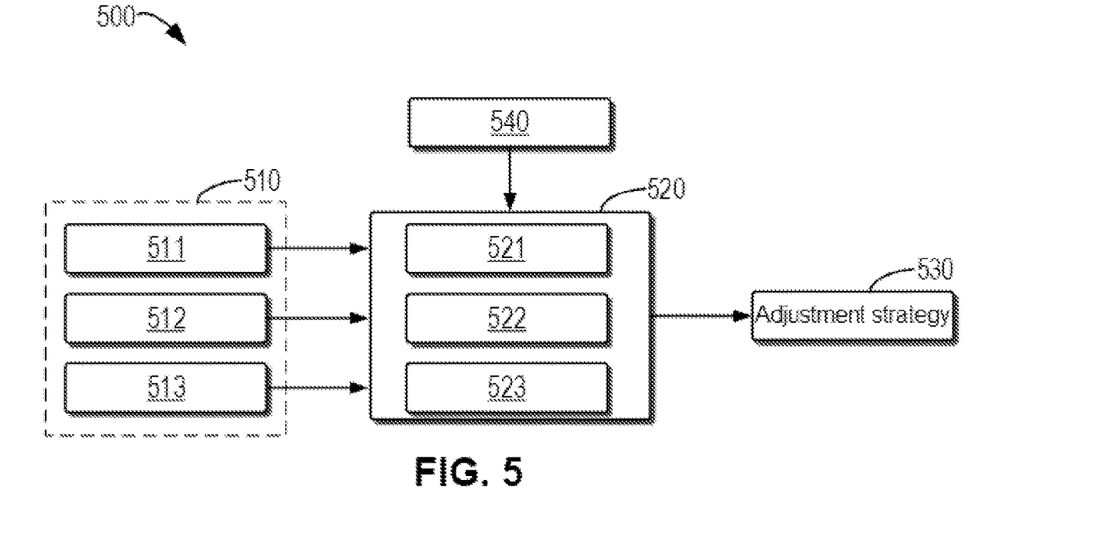
FIG. 5 shows a schematic diagram of another example environment according to an embodiment of the present disclosure.

In order to further show the resource management solution of the present disclosure, another example environment 500 similar to example environment 100 of FIG. 1 will be described in detail below with reference to FIG. 5. FIG. 5 shows a schematic diagram of another example environment 500 according to an embodiment of the present disclosure. In example environment 500, a device and/or a process according to embodiments of the present disclosure may be implemented.

As shown in FIG. 5, example environment 500 may include storage device 510, computing device 520, adjustment strategy 530, and log device 540. Storage device 510 includes various caches for storing metadata, such as BMD cache 511, IB cache 512, CG cache 513, or other types of caches. These caches, upon detecting that the amount of stored data exceeds a certain proportion of maximum storage amounts thereof, may send a trigger signal to computing device 520. Further, log device 540 is configured to store a modification event describing the metadata in response to a metadata modification request of a user. Therefore, log device 540, in addition to a plurality of caches, such as BMD cache 511, IB cache 512, and CG cache 513, in storage device 510, may also send trigger information to computing device 520 when the amount of log data stored in the log device exceeds a threshold storage amount thereof. As described above, computing device 520 may determine adjustment strategy 530 according to the trigger information and frequencies thereof.

Further, as shown in FIG. 5, arbitration module 521, sensing module 522, and execution module 523 are further included in computing device 520. Specifically, arbitration module 521 is configured to determine the level of the received trigger information, so that when two types of trigger information are received simultaneously, it can be determined whether a task corresponding to certain trigger information needs to be allocated with computing resources preferentially. As an example, when a trigger signal for an operating system or log device 540 is received while the trigger signal from the above cache is received, an operation of stopping the operating system or clearing log device 540 is performed before performing the operation of copying the modified metadata to the storage medium.

Further, arbitration module 521 is further configured to determine a plan for resource allocation based on a variation trend of a computing resource request frequency. Sensing module 522, in conjunction therewith, is configured to receive the trigger information from each storage device or log device in real time, and execution module 523 is configured to begin a corresponding resource allocation operation after arbitration module 521 determines the plan for resource allocation.

Figure 6:
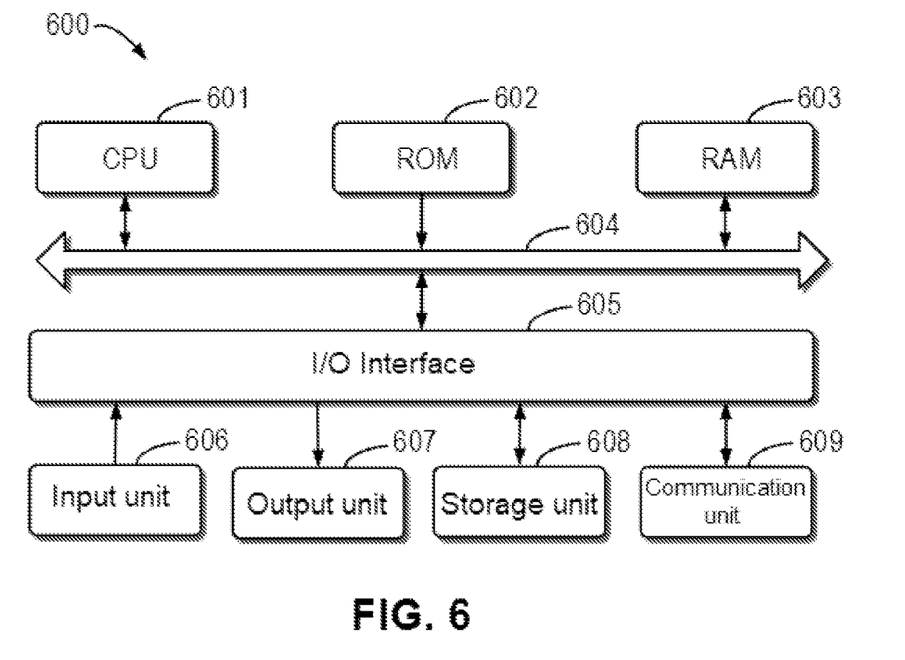
FIG. 6 shows a block diagram of an example device that can be configured to implement an embodiment of the present disclosure.

FIG. 6 shows a schematic block diagram of example electronic device 600 that may be configured to implement an embodiment of the present disclosure. For example, electronic device 600 may be configured to implement computing device 120 as shown in FIG. 1. As shown in the figure, electronic device 600 includes CPU 601 that may perform various appropriate actions and processing according to computer program instructions stored in read-only memory (ROM) 602 or computer program instructions loaded from storage unit 608 into random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet and/or various telecommunication networks.

Processing unit 601 performs the various methods and processing described above, such as process 200. For example, in some embodiments, the various methods and processing described above may be implemented as a computer software program or a computer program product, which is tangibly included in a machine-readable medium, such as storage unit 608. In some embodiments, part or all of the computer programs may be loaded and/or installed onto device 600 via ROM 602 and/or communication unit 609. When the computer program is loaded into RAM 603 and executed by CPU 601, one or more steps of any process described above may be implemented. Alternatively, in other embodiments, CPU 601 may be configured in any other suitable manners (for example, by means of firmware) to perform a process such as process 200.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for computing resource management, comprising:
 determining a first resource request frequency based on the number of trigger signals received from a storage device during a first period, the trigger signals being generated when a data amount of modified metadata stored in the storage device reaches a threshold data amount;
 determining a second resource request frequency based on the number of trigger signals received from the storage device during a second period subsequent to the first period; and
 adjusting computing resources for performing an operation of copying the modified metadata in the storage device to a storage medium based on a comparison of the first resource request frequency and the second resource request frequency;
 wherein adjusting the computing resources based on the comparison comprises:
 if the first resource request frequency is lower than the second resource request frequency, increasing the computing resources; and
 wherein increasing the computing resources comprises:
 if the number of enabled input output (IO) resources in an enabled thread is less than a threshold resource number, causing non-enabled IO resources in the thread to perform the operation of copying; or
 if the number of the enabled IO resources in the thread is greater than or equal to the threshold resource number, causing non-enabled additional threads to perform the operation of copying.

2. The method according to claim 1, wherein the threshold resource number is determined based on a maximum number of other IO resources that are enabled during a process from IO resources being enabled to being released.

3. The method according to claim 1, wherein adjusting the computing resources based on the comparison comprises:
 if the first resource request frequency is higher than the second resource request frequency, reducing the computing resources for performing the operation of copying.

4. The method according to claim 3, wherein reducing the computing resources comprises:
 if the number of enabled threads is greater than a threshold thread number, releasing at least one of the enabled threads; or
 if the number of the enabled threads is smaller than or equal to the threshold thread number, releasing at least one enabled IO resource in the enabled threads.

5. The method according to claim 1, further comprising:
 in response to receiving a control signal for an operating system or a log storage device, performing an operation of stopping the operating system or clearing the log storage device before performing the operation of copying the modified metadata to the storage medium.

6. An electronic device, comprising:
 a processor; and
 a memory coupled to the processor and having instructions stored therein which, when executed by the processor, cause the electronic device to perform actions comprising:
 determining a first resource request frequency based on the number of trigger signals received from a storage device during a first period, the trigger signals being generated when a data amount of modified metadata stored in the storage device reaches a threshold data amount;
 determining a second resource request frequency based on the number of trigger signals received from the storage device during a second period subsequent to the first period; and
 adjusting computing resources for performing an operation of copying the modified metadata in the storage device to a storage medium based on a comparison of the first resource request frequency and the second resource request frequency;
 wherein adjusting the computing resources based on the comparison comprises:
 if the first resource request frequency is higher than the second resource request frequency, reducing the computing resources for performing the operation of copying; and
 wherein reducing the computing resources comprises:

if the number of enabled threads is greater than a threshold thread number, releasing at least one of the enabled threads; or
if the number of enabled threads is smaller than or equal to the threshold thread number, releasing at least one enabled IO resource in the enabled threads.

7. The electronic device according to claim 6, wherein adjusting the computing resources based on the comparison comprises:
if the first resource request frequency is lower than the second resource request frequency, increasing the computing resources.

8. The electronic device according to claim 7, wherein increasing the computing resources comprises:
if the number of enabled input output (IO) resources in an enabled thread is less than a threshold resource number, causing non-enabled IO resources in the thread to perform the operation of copying; or
if the number of the enabled IO resources in the thread is greater than or equal to the threshold resource number, causing non-enabled additional threads to perform the operation of copying.

9. The electronic device according to claim 8, wherein the threshold resource number is determined based on a maximum number of other IO resources that are enabled during a process from IO resources being enabled to being released.

10. The electronic device according to claim 6, the actions further comprising:
in response to receiving a control signal for an operating system or a log storage device, performing an operation of stopping the operating system or clearing the log storage device before performing the operation of copying the modified metadata to the storage medium.

11. The electronic device according to claim 6, wherein the actions further comprise:
copying metadata from the storage device to the storage medium while the computing resources are adjusted to avoid the metadata from being not timely written to the storage medium due to insufficient computing resources.

12. The electronic device according to claim 11, wherein the storage device is a cache;
wherein the storage medium includes a set of storage drives constructed and arranged to provide log-type file system storage; and
wherein copying metadata from the storage device to the storage medium includes:
flushing the metadata from the cache to the set of storage drives.

13. A computer program product having a non-transitory computer readable medium which stores a set of instructions to perform computing resource management; the set of instructions, when carried out by computerized circuitry, causing the computerized circuitry to perform a method of:
determining a first resource request frequency based on the number of trigger signals received from a storage device during a first period, the trigger signals being generated when a data amount of modified metadata stored in the storage device reaches a threshold data amount;
determining a second resource request frequency based on the number of trigger signals received from the storage device during a second period subsequent to the first period; and
adjusting computing resources for performing an operation of copying the modified metadata in the storage device to a storage medium based on a comparison of the first resource request frequency and the second resource request frequency;
wherein adjusting the computing resources based on the comparison comprises:
if the first resource request frequency is higher than the second resource request frequency, reducing the computing resources for performing the operation of copying; and
wherein reducing the computing resources comprises:
if the number of enabled threads is greater than a threshold thread number, releasing at least one of the enabled threads; or
if the number of the enabled threads is smaller than or equal to the threshold thread number, releasing at least one enabled IO resource in the enabled threads.

14. The method according to claim 1, wherein the method further comprises:
copying metadata from the storage device to the storage medium while the computing resources are adjusted to avoid the metadata from being not timely written to the storage medium due to insufficient computing resources.

15. The method according to claim 14, wherein the storage device is a cache;
wherein the storage medium includes a set of storage drives constructed and arranged to provide log-type file system storage; and
wherein copying metadata from the storage device to the storage medium includes:
flushing the metadata from the cache to the set of storage drives.

16. The computer program product according to claim 13, wherein the method further comprises:
copying metadata from the storage device to the storage medium while the computing resources are adjusted to avoid the metadata from being not timely written to the storage medium due to insufficient computing resources.

17. The computer program product according to claim 13, wherein adjusting the computing resources based on the comparison comprises:
if the first resource request frequency is lower than the second resource request frequency, increasing the computing resources.

18. The computer program product according to claim 17, wherein increasing the computing resources comprises:
if the number of enabled input output (IO) resources in an enabled thread is less than a threshold resource number, causing non-enabled IO resources in the thread to perform the operation of copying; or
if the number of the enabled IO resources in the thread is greater than or equal to the threshold resource number, causing non-enabled additional threads to perform the operation of copying.

19. The computer program product according to claim 18, wherein the threshold resource number is determined based on a maximum number of other IO resources that are enabled during a process from IO resources being enabled to being released.

20. The computer program product according to claim 13, the actions further comprising:
in response to receiving a control signal for an operating system or a log storage device, performing an operation of stopping the operating system or clearing the log storage device before performing the operation of copying the modified metadata to the storage medium.

* * * * *